Sept 10, 1957      A. E. MARTIN, JR      2,805,449
THICKNESS VARIATION MEASURING DEVICE
Filed July 23, 1954
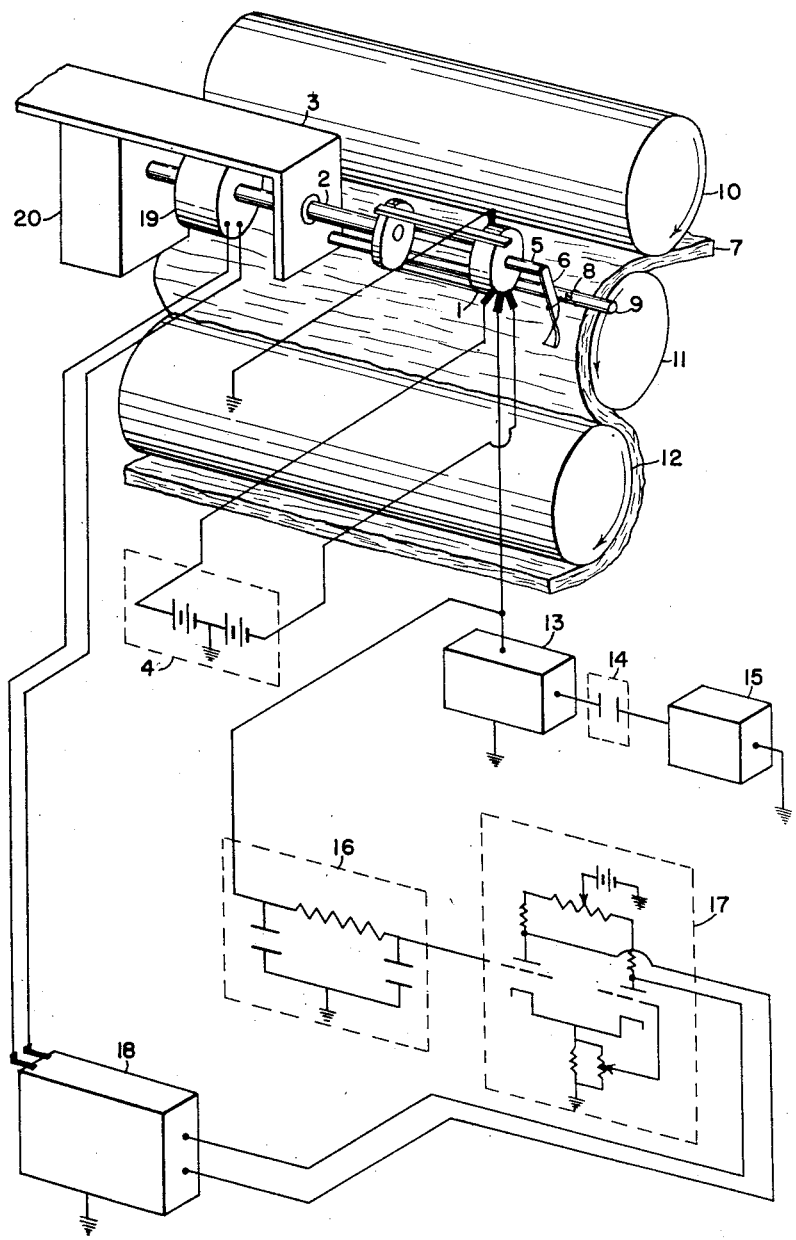
INVENTOR
ALBERT E. MARTIN JR.
BY
*R. Hoffman*   ATTORNEY

United States Patent Office 2,805,449
Patented Sept. 10, 1957

2,805,449

THICKNESS VARIATION MEASURING DEVICE

Albert E. Martin, Jr., New Orleans, La., assignor to the United States of America as represented by the Secretary of Agriculture Application July 23, 1954, Serial No. 445,490

1 Claim. (Cl. 19—70)

(Granted under Title 35, U. S. Code (1952), sec. 266)

A non-exclusive irrevocable, royalty-free license in the invention herein described, for all governmental purposes, throughout the world, with the power to grant sublicenses for such purposes, is hereby granted to the Government of the United States of America.

This invention relates to measuring the variations in thickness along continuous lengths of material. More particularly, the invention provides a combination of electrical and mechanical elements which is particularly adapted for measuring and, if desired, recording the root mean square of the deviation in thickness in terms of the percent of the average thickness of a continuous length of material, and/or for controlling the machinery producing the material to decrease variations in average thickness.

The uniformity of the thickness of continuous lengths of various materials, e. g., strips or bats such as picker laps and the like or strands such as slivers, rovings and the like of textile materials, is an important criterion of their usefulness for their intended purposes.

Some types of devices heretofore used for measuring the variation in thickness of such textile materials require a destructive sampling of the material. Other types of measuring devices heretofore used require the measurement of a capacitance whose dielectric comprises the test material and which require the avoidance of or corrections for thermal changes induced in the capacitance measuring head which can be of the same magnitude as those changes induced by the test material. In data from which variations in the average thickness of the material can be calculated, they usually do not provide a direct measure and/or means for reducing such variations.

A primary object of the present invention is to provide an electro-mechanical measuring device which is capable of continuously and non-destructively measuring both variations in the thickness of small increments of a continuous length of a material and variations in the average thickness of many such small increments, which is adapted for use in controlling the machinery producing the continuous length of material to reduce variations in average thickness of the material and which is not dependent on measurements of a capacitance governed by the material.

In general, the device provided by this invention comprises: a means responsive to the thickness of a continuous length of material for moving a movable contact member back and forth along the central portion of a center grounded linear resistance element to which are applied equal but opposite polarity D. C. voltages from points equidistant from the ground; a means for screening out the D. C. component of the voltages picked up by the movable contact member and feeding the A. C. component thereof to a root mean square voltmeter; a means for screening out most of the A. C. component of the voltages picked up by the movable contact member and feeding the D. C. component thereof through a means for detecting the polarity and magnitude of this D. C. component with respect to ground to a servo amplifier supplying a servo motor the shaft of which is connected (a) to a means for moving the center grounded resistance element in a direction tending to eliminate the D. C. component of voltages picked up by the movable contact member and (b) to a mechanical means for adjusting a control element of the machinery producing the material being measured to alter the thickness of the material produced in a direction tending to reduce the variation in average thickness. Where a record of the variations in thickness is desired, the root mean square voltmeter is provided with the usual recording means. Where an indication of the variation in average thickness is desired, an indicating or recording means can be mechanically connected to the shaft of the servo motor, or to the potentiometer housing and/or supporting structure. Alternatively, an electrical indicator or recording means can be connected across the output terminals of the vacuum tube voltmeter circuit.

The single figure of the drawings is a schematic arrangement of parts illustrating an embodiment of this invention.

The housing 1 of a center tapped linear potentiometer is rigidly attached to shaft 2 which is rotatably supported by frame member 3. The ends of the potentiometer resistance elements are joined into a circuit, such as the circuit schematically illustrated at 4, in which equal but opposite polarity D. C. voltages are applied to the center grounded resistance element from points equidistant from the ground. Substantially any linear resistance element and substantially any sources of equal and opposite polarity D. C. voltages can be used. Shaft 5 of the potentiometer that carries the conventional movable contact member thereof (not visible), inside the housing is rigidly connected to presser foot 6.

Presser foot 6 is urged into contact with the strip of material being measured, lap 7, by spring 8 which is attached to frame member 9. A driving means, not shown, rotates rolls 10, 11, and 12 which are rotatably mounted on supports, not shown, to move lap 7 past the presser foot so that the latter rocks in response to the variations in thickness of increments of the lap having a length about equal to the contacting sole of the presser foot.

The connection of presser foot 6 to shaft 5 carrying the movable contact element of the center tapped linear potentiometer provides a means for moving the contact member back and forth along the linear resistance element. A wide variety of means for moving the contact element can be used. For example, if it is desired to measure the variation in compressibility of a strand, such as a sliver or roving, the potentiometer shaft 5 can be connected to the thickness responsive pointer arm of a sliver testing device such as that illustrated in Textile Research Journal, volume 20, pages 780–786, November 1950. In addition, the means for responding to the variations in thickness of the material being measured can have a wide variety of shapes or sizes, to respond to variations over different increments of the length and width of the material being measured. Furthermore, a plurality of such thickness responsive means can be distributed over the width of the continuous length of material being measured.

The voltages at the potentiometer tap which is connected to the movable contact member of the potentiometer are applied to linear amplifier 13. Substantially any type of linear amplifier, or no amplifier at all, can be used, depending upon the strength of the signal obtained from the potentiometer and the sensitivity of the meter or instrument to which the signal is fed. The amplified signal (or that coming directly from the potentiometer, if strong enough) is fed to a root mean square voltmeter 15 through condenser 14 which blocks the D. C. components but permits the A. C. components to pass. The characteristics of blocking condenser 14 are selected so that its impedance is small at the lowest frequency i. e. longest fluctuation, to be detected. The root mean square voltmeter is preferably calibrated to indicate the root mean square of the deviation in thickness in terms of percent of average thickness and is preferably provided with a continuous recording means.

The potentiometer tap connected to the movable contact of the potentiometer is also connected to a filter circuit, schematically illustrated at 16, to screen out most of the A. C. component thereof. The balance between the capacitance and resistance element of such a filter circuit is preferably selected so that the capacitative reactance is negligible at the highest frequency of fluctuations which it is desired to ignore.

The substantially D. C. component which passes filter circuit 16 is fed through a means for detecting the magnitude and polarity of the voltage with respect to ground, such as the balanced bridge vacuum tube voltmeter circuit 17. The output side of this circuit, instead of being connected to a signal indicating device, is connected directly to a null balance servo amplifier 18. After being amplified the signal is fed to servo motor 19, the shaft of which is extended to provide shaft 2.

Servo motor 19 is arranged to rotate the potentiometer housing 1 in a direction which tends to reduce any D. C. voltage picked up by the movable contact member of the potentiometer by aligning the grounded center of the potentiometer resistance element with the center of the path over which the movable contact member oscillates in response to the variation in thickness of lap 7 as it passes presser foot 6.

The other end of the shaft of motor 19 is extended and mechanically attached to an adjustable element, not shown, of speed controller 20. Speed controller 20 is attached to and controls the machine which forms the material being measured, such as lap 7. The connection between motor 19 and the speed controller 20 is arranged so that the motor changes the speed of the machines producing the material being measured in a direction which tends to reduce the variation in average thickness.

I claim:

In a machine for producing continuous lengths of material, a device for measuring and controlling the thickness of said continuous lengths of material comprising: a series of rotatable rolls for moving the material; means responsive to variations in thickness of the material in contact with a surface of said material; a potentiometer having a housing, a center-grounded linear resistance element within said housing, a contact element in slidable electrical contact with said resistance, and a shaft having the slidable contact element rigidly secured to one end of said shaft and the thickness responsive means rigidly secured to the other end of said shaft; a source of direct current connected to the ends of the linear resistance element for applying voltages of equal but opposite polarity with respect to ground to the resistance element whereby movements of the thickness responsive means due to variations in thickness and of the slidable contact element will cause a variation of intensity and polarity of the voltage at said contact element and result in a variable signal, having both alternating and direct current components, being transmitted by the potentiometer; a first amplifier electrically connected to the slidable contact for amplifying said signal, said amplifier producing an amplified signal having both alternating and direct current components; a first filter means connected to the output side of the amplifier for blocking the direct current component of the amplified signal; means connected to said first filter means for measuring the intensity of the alternating current component of the amplified signal; second filter means electrically connected to the slidable contact for filtering out the alternating current component of the signal from the potentiometer; a balanced bridge circuit connected to said second filter means for detecting variations in polarity and magnitude of the direct current component of the signal from the potentiometer due to variations in thickness of the continuous length of material; a second amplifier connected to the bridge circuit for amplifying the intensity of the signal variations; a servo motor connected to the output side of said second amplifier, said servo motor having a shaft one end of which is mechanically connected to the potentiometer housing and to the center-grounded resistance, said servo motor being so connected to said second amplifier that changes in signal intensity and polarity will cause rotation of the servo motor shaft and center-grounded resistance in such a direction as to eliminate the signal transmitted by the potentiometer and to restore the bridge circuit to a balanced state; and mechanical means connected to the other end of said servo motor shaft for controlling the machine producing the continuous length of material to alter the thickness of said material and to reduce the variations in average thickness thereof.

References Cited in the file of this patent

UNITED STATES PATENTS

| 2,466,615 | Rusca et al. | Apr. 5, 1949 |
| 2,680,299 | Strother | June 8, 1954 |
| 2,682,144 | Hare | June 29, 1954 |

FOREIGN PATENTS

| 720,200 | Germany | Apr. 28, 1942 |
| 1,012,370 | France | July 9, 1952 |